Nov. 26, 1940.　　　J. BLACKBURN　　　2,222,998
WIRE CONNECTOR
Filed April 22, 1938

Inventor
Jasper Blackburn
by Adam C. Fisher

Patented Nov. 26, 1940

2,222,998

UNITED STATES PATENT OFFICE 2,222,998

WIRE CONNECTOR

Jasper Blackburn, Webster Groves, Mo.

Application April 22, 1938, Serial No. 203,497

6 Claims. (Cl. 24—243)

This invention relates to connectors or clamps for operatively joining two or more electric conductors or wires, such as service lines to main lines in the various forms of electrical installations, and the invention relates more particularly to that form of connector embodying a bifurcated and threaded bolt whereon is threadedly mounted a nut having a bearing element rotatably mounted through the orifice of the nut and adapted to travel longitudinally through the slot of the bolt as the nut is turned thereupon. One serious objection to this form of connector is that under the vibrations commonly incident to wires so joined, the nut may retract slightly upon the bolt, thereby creating an imperfect connection resulting in humming and rattling noises at the joint.

It is the prime object of the present invention therefore to provide a connector of the kind referred to, wherein means are included for preventing the said retraction of the nut and the consequent defects of the joint.

Another object of the invention is to provide, in combination with a bifurcated and threaded bolt a unitary bearing element and double nut assembly, the same comprising a bearing element adapted to travel through the slot of the bolt and whereon are mounted in close face to face association for independent rotative movement a pair of tapped nuts adapted to threadedly engage the bolt, one of the nuts being designed to serve as a press nut and the other as a lock nut, both said nuts being permanently and operatively held upon the bearing element.

Another object is to provide in a wire connector embodying a bifurcated and threaded bolt designed for engaging wires within the slot thereof, a unitary bearing element and double nut assembly, the bearing element being adapted to travel through the slot of the bolt and being in the form of a yoke whereon are mounted for independent rotative movement a pair of nuts adapted to thread upon the bolt as the bearing element moves through the slot thereof for the purpose of clamping the wires at the head of the bolt, after which the outer nut may be given an additional turn or torque for the purpose of locking the nuts firmly upon the bolt against retraction under vibration.

With the foregoing objects and advantages in view, together with such other and further advantages as may appear in the following specification, attention is directed to the accompanying drawing constituting a part of the specification and embodying certain preferred structural features of the invention, and wherein—

Figure 1:
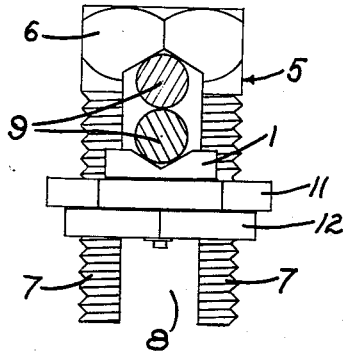
Figure 1 is a side elevation showing two wires joined together with a connector of the bifurcated bolt type having mounted thereon the unitary double nut and bearing element assembly constituting the subject of this invention, the bearing element serving as a yoke for operatively retaining the nuts in place thereupon. In this view the joined wires are shown in section.
Figure 6:
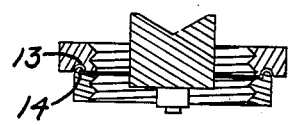
Figure 6 is a sectional detail of a modified form of bearing element and double nut assembly, wherein the contacting faces of the nuts are formed, one with an annular boss and the other with a registering annular groove for engaging the boss, and whereby the nuts are held together against lateral slippage.
Figure 2:
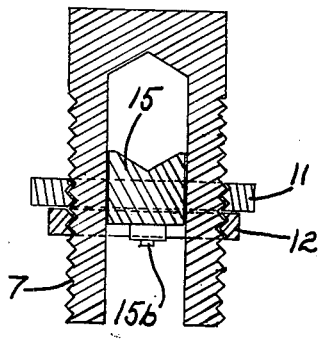
Figure 2 is a longitudinal section through the assembly of Figure 1, the wires being omitted.

In combination with a bifurcated and threaded bolt represented generally at 5, and which includes the head portion 6 and segmentally threaded legs 7 defining the intermediate wire slot 8 for engaging the wires 9 which are to be joined, the invention comprises a pair of nuts 11—12 adapted to turn upon the bolt 5 over the slot thereof and up towards the head 6. The innermost nut may be designated as a press nut and is represented at 11, while the outermost nut 12 may be designated as a lock nut. The contiguous faces of these nuts may be formed plain and flat, as represented in Figures 1 and 2, or may be formed one with a boss 13 and the other with a groove 14, both of annular formation and equal diameter, as clearly shown in Figure 6, whereby the nuts are adapted for mutual engagement upon or at their contiguous faces, for preventing lateral slippage.

A bearing element 15 is passed diametrically through the aligned orifices of the two nuts, this element being designed and adapted to travel freely through the slot 8 of the bolt as the nuts are turned thereupon. This bearing element is formed at its inner side or face with extended extremities 15a which overlie the inner face of the press nut 11. The body of the bearing element extends freely through the orifices of the nuts as stated, and at the outer side or face of the assembly, spurs or tabs 15b are struck or pressed out laterally from the ends of the outer elongated margin of the body of the bearing element as passed through the nuts, and which spurs overlie the outer face of the outer nut 12, thereby providing means for permanently retaining the two nuts in place upon the bearing element, the latter functioning as a yoke for that purpose as well as serving in its normal capacity as a bearing element. The nuts are designed to be held together in close association, yet not too tightly, being left free enough for independent rotation.

It is an advantageous feature in such a connector that the two nuts yoked upon the bearing element be maintained at all times in a position of exact alignment, ready for instant turning upon the bolt, and without waste of time in aligning the nuts for this purpose. This constant alignment may be accomplished through the provision of the co-acting boss and groove structures illustrated in Figure 6, and wherein one of the nuts as the press nut 11 is formed with an annular groove 13, and the lock nut 12 is formed with a registering annular boss 14, these formations being upon the inner contiguous faces of the nuts, where they will mutually engage one another and hold the nuts in exact operative alignment, against lateral slippage.

Figure 3:
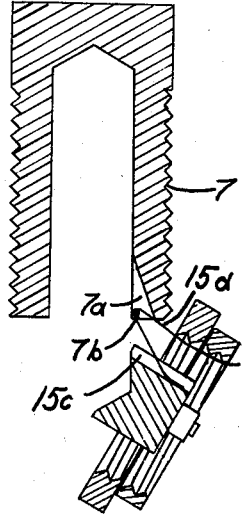
Figure 3 is a longitudinal section through a special type of connector heretofore patented to this applicant and wherein the bearing element and nut assembly is permanently linked to an end of one of the legs of the bolt, the bearing element and nut assembly in this instance being of the form of my invention.
Figure 4:
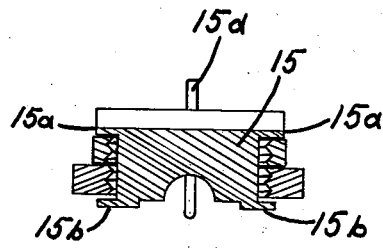
Figure 4 is a sectional detail through the bearing element and nut assembly of Figure 3 removed from the bolt.
Figure 5:
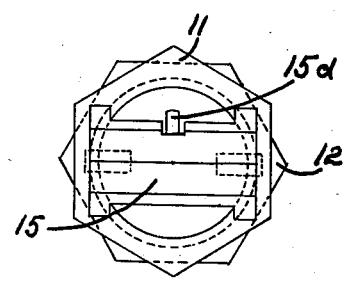
Figure 5 is a top plan view of the assembly of Figure 4.

In the assembly as represented in Figures 3, 4, and 5, the double nut and bearing element assembly as described, is shown as applied to a special unitary form of connector described in my former patent numbered 2,020,989, and wherein a cut out portion 7a is formed through the extremity of one of the legs, and a strand of wire 7b is extended across the outer tips or margins of the cut out portion, the bearing element being formed with a groove 15c connecting the inner and outer faces of the element, over an outer side thereof, and an open spring loop 15d being anchored within this groove with the bight thereof turned inwardly towards the head of the bolt. When mounted upon this type of connector, the pair of nuts when turned off the end of the bolt, will hang suspended together in exact alignment upon the free end of the spring loop, and will swing laterally aside as the free end of the loop passes out through the cut out portion 7a and the bight of the loop engages the cross wire 7b and hangs thereupon. In this position the nuts are always and automatically held in ready alignment for rethreading upon the bolt, and time is economized.

Through the combination of the bearing element, the same functioning also as a yoke for permanently retaining the pair of nuts in close and operative association, one functioning as a press nut and the other as a lock nut, the entire assembly being unitary in nature, and designed to act as a unit in the process of clamping wires at the head of the bolt, within the slot thereof, after which the outer lock nut is given an additional turn or torque for firmly locking the nuts together against retraction, a new and useful invention has been provided, especially adapted to the purposes hereinbefore referred to. From the foregoing description it is thought that the use and operation of the invention will be fully understood, and while I have herein shown and described a certain embodiment and special structural features thereof, the right is reserved to make such changes, alterations or modifications as may be considered expedient in order to provide a practicable and commercially effective device of the kind described, not departing however from the essence of the invention as defined in the appended claims.

I claim:

1. In a wire connector embodying a bifurcated and threaded bolt the legs thereof defining a medial wire engaging slot, a unitary bearing element and double nut assembly, the bearing element being of a width intimately fitting the slot adapted to travel through the slot of the bolt and being in the form of a yoke, and a pair of contiguous nuts rotatably mounted in axial alignment upon the yoke and permanently held thereon, the said nuts being adapted for independent rotative movement on the bearing element and for threadedly engaging the bolt as the bearing element traverses the slot thereof, the inner nut being designed to function as a press nut and the outer nut to function as a lock nut.

2. In a device of the kind described, a double nut assembly consisting of a pair of nuts having orifices, yoke member extending through said orifices, relatively rotatably connecting said nuts together with their orifices in alignment, the protruded ends of the yoke member laterally overlying the outer marginal and annular faces of the nuts.

3. In a device of the kind described, a double nut assembly consisting of a pair of nuts positioned together with their orifices in alignment, and a yoke passed freely through the orifices, the yoke having outer extended ends spread laterally over the outer annular margins of the nuts, whereby the nuts are held in relative rotatable association.

4. In a wire connector according to claim 1, interfitting means between the contiguous faces of the nuts to prevent relative lateral slippage of the nuts.

5. In a wire connector embodying a bifurcated bolt providing spaced legs and a wire-engaging slot between them, one of said legs having a cut out portion open at one end wall thereof, a transverse wire crossing the cut out portion, a bearing element of a width snugly fitting the slot and movable as a follower in the slot, a pair of nuts for said bolt, an open spring loop passing through the bores of the nuts and fastened on one side of the bearing element with its bight innermost, the free end of the loop being adapted to enter said cut out portion as the bearing element is moved outward, said pair of nuts being rotatably mounted in axial alignment upon the bearing element and over the free end of the spring loop, the nuts being adapted to hang on said wire from the bight of the spring loop, said bight extending beyond the bearing element towards the head of the bolt to enable alignment of the bearing element with the entrance of the slot.

6. In a wire connector according to claim 5, the spring loop being of a dimension beyond the nuts in the direction of the head of the bolt to contact and flex on the extremity of the adjacent leg.

JASPER BLACKBURN.